United States Patent
Machida et al.

(10) Patent No.: US 6,375,595 B1
(45) Date of Patent: Apr. 23, 2002

(54) TOROIDAL TYPE CONTINUOUSLY VARIABLE TRANSMISSION

(75) Inventors: Hisashi Machida, Fujisawa; Takashi Imanishi, Yokohama; Kouji Ishikawa, Fujisawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/401,306

(22) Filed: Sep. 23, 1999

(51) Int. Cl.$^7$ ............................................... F16H 15/38
(52) U.S. Cl. ............................ 476/42; 476/46; 403/354
(58) Field of Search ............................. 476/42, 41, 40, 476/46; 464/157, 106, 104, 103, 102; 403/354, 381

(56) References Cited

U.S. PATENT DOCUMENTS

| | | | | |
|---|---|---|---|---|
| 126,021 A | * | 4/1872 | Click | 464/106 |
| 1,173,289 A | * | 2/1916 | McKee | 403/354 |
| 1,948,708 A | * | 2/1934 | Grundy | 464/102 |
| 3,320,771 A | * | 5/1967 | Roethlisberger et al. | 464/157 |
| 3,430,504 A | * | 3/1969 | Dickenbrock | 476/42 |
| 4,893,517 A | | 1/1990 | Nakano | |
| 5,067,360 A | * | 11/1991 | Nakano | 476/41 |
| 5,338,268 A | * | 8/1994 | Greenwood | 476/42 |
| 5,368,529 A | * | 11/1994 | Machida | 476/42 |
| 5,797,727 A | * | 8/1998 | Peters et al. | 416/204 R |

FOREIGN PATENT DOCUMENTS

| | | | | |
|---|---|---|---|---|
| DE | 198 06 538 | 8/1998 | | |
| DE | 198 34 958 | 2/1999 | | |
| JP | 62-71465 | 5/1987 | | |
| JP | 1-173552 | 12/1989 | | |
| JP | 06307514 | * 1/1994 | | 476/42 |
| JP | 7-96901 | 10/1995 | | |
| JP | 8-35550 | 2/1996 | | |

OTHER PUBLICATIONS

Matek, Wilhelm et al.; "Roloff/Matek Maschinenelemente"; Braunschweig/Wiesbaden; Friedr. Vieweg & Sohn, 1992, p. 368 (ISBN 3–528–64058–6).

Beitz, Wolfgang et al.; "Dubbel, Taschenbuch fur den Maschinebau"; 17 Aufl. 1990, Springer, 1990, S. G32 (ISBN 3–540–52381–2).

Fachkunde Metall, 47. Uberarb. U. erganzte Aufl. Wuppertal: Europa–Lehrmittel, 1985, S. 312 (ISBN 3–8085–1027–7).

* cited by examiner

Primary Examiner—David A. Bucci
Assistant Examiner—William C Joyce
(74) Attorney, Agent, or Firm—Miles & Stockbridge P.C.

(57) ABSTRACT

A plural cavity toroidal transmission is designed to permit transmission of great torque between output side disks and a sleeve while maintaining a thickness of the sleeve. To this end, convex portions are formed on outer surfaces of the output side disks and concave portions are formed on edge portions of both axial ends of the sleeve. By fitting the convex portions into the concave portions, synchronous rotations of the pair of output side disks and transmission of rotation from the output side disks to an output gear can be achieved.

16 Claims, 9 Drawing Sheets

TOROIDAL TYPE CONTINUOUSLY VARIABLE TRANSMISSION

BACKGROUND OF THE INVENTION

1. Field of the Invention

A toroidal type continuously variable transmission according to the present invention can be used, for example, as a speed change unit of a transmission of a motor vehicle or transmissions of various industrial machines.

2. Related Background Art

A toroidal type continuously variable transmission schematically shown in FIGS. 7 and 8 has been investigated for use as a transmission of a motor vehicle. For example, as disclosed in Japanese Utility Model Laid-Open Application No. 62-71465, in such a toroidal type continuously variable transmission, an, input side disk 2 is supported in coaxial relationship with an input shaft 1 and an output side disk 4 is secured to an end of an output shaft 3 disposed in coaxial relationship with the input shaft 1. Within a casing containing the torodial type continuously variable transmission, there are provided trunnions 6 rockable around pivot shafts 5 transverse to the input shaft 1 and the output shaft 3.

Each trunnion 6 is provided at opposite end surfaces with the pivot shafts 5 in coaxial relationship with each other. Further, central portions of the trunnions 6 support proximal ends of displacement shafts 7 so that inclination angles of the displacement shafts 7 can be adjusted by rocking or swinging the trunnions 6 around the pivot shafts 5. Power rollers 8 are rotatably supported around the displacement shafts 7 supported by the trunnions 6. The power rollers 8 are interposed between opposed inner surfaces 2a and 4a of the input side disk 2 and the output side disk 4. The inner surfaces 2a, 4a have concave surfaces obtained by rotating arcs having centers on the pivot shafts 5. Peripheral surfaces 8a of the power rollers 8 having spherical convex shapes abut against the inner surfaces 2a, 4a.

A pressing device 9 of loading cam type is disposed between the input shaft 1 and the input side disk 2 so that the input side disk 2 can be urged elastically toward the output side disk 4 by the pressing device 10. The pressing device 9 comprises a loading cam (cam plate) 10 rotated together with the input shaft 1, and a plurality (for example, four) of rollers 12 rotatably held by a holder 11. One side surface (right side surface in FIGS. 7 and 8) of the loading cam 10 is constituted as a cam surface 13 having unevenness or undulation extending along a circumferential direction, and an outer surface (left side surface in FIGS. 7 and 8) of the input side disk 2 has a similar cam surface 14. The plurality of rollers 12 are rotatably supported for rotation around axes extending radially with respect to the center line of the input shaft 1.

In use of the toroidal type continuously variable transmission having the above-mentioned construction, when the loading cam 10 is rotated as the input shaft 1 is rotated, the plurality of rollers 12 are urged against the cam surface 14 formed on the outer surface of the input side disk 2 by the cam surface 13. As a result, the input side disk 2 is urged against the plurality of power rollers 8, and, at the same time, due to the frictional engagement between the cam surfaces 13, 14 and the plurality of rollers 12, the input side disk 2 is rotated. Rotation of the input side disk 2 is transmitted to the output side disk 4 through the plurality of power rollers 8, thereby rotating the output shaft 3 secured to the output side disk 4.

In a case where a rotational speed ratio (speed change ratio) between the input shaft 1 and the output shaft 3 is changed, when deceleration is effected between the input shaft 1 and the output shaft 3, the trunnions 6 are rocked or swung around the pivot shafts 5 in predetermined directions, thereby inclining the displacement shafts 7 so that the peripheral surfaces 8a of the power rollers 8 abut against a portion of the inner surface 2a of the input side disk 2 near the center and a portion of the inner surface 4a of the output side disk 4 near its outer periphery, respectively, as shown in FIG. 7. On the other hand, when acceleration is effected, the trunnions 6 are rocked around the pivot shafts 5 in opposite directions, thereby inclining the displacement shafts 7 so that the peripheral surfaces 8a of the power rollers 8 abut against a portion of the inner surface 2a of the input side disk 2 near its outer periphery and a portion of the inner surface 4a of the output side disk 4 near the center, respectively, as shown in FIG. 8. If the inclination angles of the displacement shafts 7 are selected to an intermediate value between FIG. 7 and FIG. 8, an intermediate speed change ratio can be obtained.

FIGS. 9 and 10 show an example of a toroidal type continuously variable transmission, described in Japanese Utility Model Application Laid-Open No. 1-173552. An input side disk 2 and an output side disk 4 are rotatably supported around a cylindrical input shaft 15 via needle bearings 16, respectively. Through holes 17 having circular cross-section are formed in central portions of the input side disk 2 and the output side disk 4 so that they pass through inner and outer surfaces of the disks 2, 4 axially (in a left-and-right direction in FIG. 9). The needle bearings 16 are disposed between inner peripheral surfaces of the through holes 17 and an outer peripheral surfaces of an intermediate portion of the input shaft 15. Further, locking grooves 18 formed in inner peripheral surfaces of the through holes 17 near inner surfaces receive stop rings 19 to prevent the needle bearings 16 from dislodging from the through holes 17 toward the inner surfaces 2a, 4a of the disks 2, 4. A loading cam 10 is spline-connected to an end (left end in FIG. 9) of the input shaft 15 so that the loading cam is prevented from shifting away from the input side disk 2 by a flange 20. The loading cam 10 and rollers 12 constitute a pressing device 9 for rotating the input side disk 2 while urging the input side disk toward the output side disk 4 in response to rotation of the input shaft 15. An output gear 21 is coupled to the output side disk 4 via keys 22 so that the output side disk 4 and the output gear 21 are rotated in a synchronous manner.

The ends of a pair of trunnions 6 are supported by a pair of support plates 23 for rocking movement and axial displacement movement (in a front-and-rear direction in FIG. 9 and left-and-right direction in FIG. 10). Circular holes 24 formed in intermediate portions of the trunnions 6 support displacement shafts 7. The displacement shafts 7 have support shaft portions 25 and pivot shaft portions 26 which are parallel to each other and are eccentric from each other. The support shaft portions 25 are rotatably supported within the circular holes 24 via radial needle bearings 27. Further, power rollers 8 are rotatably supported around the pivot shaft portions 26 via other radial needle bearings 28.

The pair of displacement shafts 7 are disposed at positions diametrically opposed with respect to the input shaft 15. Further, directions along which the pivot shaft portions 26 of the displacement shafts 7 are eccentric with respect to the support shaft portions 25 are the-same with respect to the rotational directions of the input side and output side disk 2, 4 (opposite directions in FIG. 10). Further, the eccentric directions are substantially perpendicular to the extending direction of the input shaft 15. Accordingly, the power rollers 8 are supported for slight displacement along the extending direction of the input shaft 15. As a result, due to elastic deformation of structural members caused by great load acting on the members in the rotational force transmitting condition, even when the power rollers 8 have tendency for displacing toward the axial direction (left-and-right direction in FIG. 9 and front-and-rear direction in FIG. 10) of the input shaft 15, the displacement can be absorbed without applying excessive force to the structural elements.

Further, between the outer surfaces of the power rollers 8 and the inner surfaces of the intermediate portions of the trunnions 6, there are disposed thrust ball bearings 29 and thrust needle bearings 30 in order from the outer surfaces of the power rollers 8. The thrust ball bearings 29 permit rotations of the power rollers 8 while supporting thrust load acting on the power rollers 8. The thrust needle bearings 30 permit the pivot shaft portions 26 and outer races 31 constituting parts of the thrust ball bearings 29 to rock around the support shaft portions 25 while supporting thrust load acting on the outer races 31 from the power rollers 8.

Further, drive rods 32 are connected to respective ends (left ends in FIG. 10) of the trunnions 6, and drive pistons 33 are secured to outer peripheral surfaces of intermediate portions of the drive rods 32. The drive pistons 33 are mounted within drive cylinders 34 in an oil tight fashion.

In the case of the toroidal type continuously variable transmission having the above-mentioned construction, the rotation of the input shaft 15 is transmitted to the input side disk 2 through the pressing device 9. The rotation of the input side disk 2 is transmitted to the output side disk 4 through the pair of power rollers 8, and the rotation of the output side disk 4 is picked up by the output gear 21. When the rotational speed ratio between the input shaft 15 and the output gear 21 is changed, the pair of drive pistons 33 are displaced in opposite directions. In response to the displacement of the drive pistons 33, the pair of trunnions 6 are displaced in opposite directions, with the result that, for example, the lower (in FIG. 10) power roller 8 is displaced to the right in FIG. 10 and the upper (in FIG. 10) power roller 8 is displaced to the left in FIG. 10. As a result, directions of tangential forces acting on contact areas between the peripheral surfaces 8a of the power rollers 8 and the inner surfaces 2a, 4a of the input and output side disks 2, 4 are changed. In response to the change in directions of forces, the trunnions 6 are rocked in opposite directions around the pivot shafts 5 rotatably supported by the support plates 23. As a result, as shown in FIGS. 7 and 8, the contact areas between the peripheral surfaces 8a of the power rollers 8 and the inner surfaces 2a, 4a are changed, thereby changing the rotational speed ratio between the input shaft 15 and the output gear 21.

Incidentally, when the rotational force is transmitted between the input shaft 15 and the output gear 21 in this way, in response to the elastic deformation of the structural members, the power rollers 8 are displaced in the axial direction of the input shaft 15 and the displacement shafts 7 rotatably supporting the power rollers 8 are slightly rotated around the support shaft portions 25. As a result of such rotation, outer surfaces of the outer races 31 of the thrust ball bearings 29 and inner surfaces of the trunnions 6 are displaced relative to each other. Since the thrust needle bearings 30 are disposed between such outer surfaces and inner surfaces, a force required for effecting such relative displacement is small. Accordingly, a force for changing the inclination angles of the displacement shafts 7 becomes small.

Further, as shown in FIGS. 11 and 12, there has been proposed an arrangement of so-called double cavity type in which two input side disks 2A, 2B corresponding to first and second outer disks and two output side disks 4 corresponding to first and second inner disks are provided around an input shaft 15a and the two input side disks 2A, 2B and the two output side disks 4 are arranged in parallel with respect to a power transmitting direction. In the arrangement shown in FIGS. 11 and 12, an output gear 21a is supported around an intermediate portion of the input shaft 15a for rotation with respect to the input shaft 15a and the output side disks 4 are spline-connected to both ends of a cylindrical sleeve 45 provided on the center of the output gear 21a. Needle bearings 16 are provided between inner peripheral surfaces of through holes 17 formed in the output side disks 4 and an outer peripheral surface of the input shaft 15a so that the output side disks 4 are supported around the input shaft 15a for rotation and axial displacement movement with respect to the input shaft 15a. Further, the input side disks 2A, 2B are supported on both ends of the input shaft 15a for rotation together with the input shaft 15a. The input shaft 15a is rotatingly driven by a drive shaft 35 through a pressing device 9 of loading cam type. Incidentally, a radial bearing 36 such as a sliding bearing or a needle bearing is disposed between an outer peripheral surface of a leading end portion (right end portion in FIGS. 11 and 12) of-the drive shaft 35 and an inner peripheral surface of a proximal end (left end in FIGS. 11 and 12) of the input shaft 15a. Accordingly, the drive shaft 35 and the input shaft 15a are arranged in a coaxial relationship and are assembled for slight displacement in a rotational direction.

A back surface (right surface in FIGS. 11 and 12) of one (right one in FIGS. 11 and 12) of the input side disks 2A abuts against a loading nut 37 via a cone-shaped leaf spring 38 having great elasticity, thereby substantially preventing axial (left-and-right direction in FIGS. 11 and 12) displacement of the input side disk relative to the input shaft 15a. On the other hand, the input side disk 2B opposed to the loading cam 10 is supported on the input shaft 15a via a ball spline 39 for axial displacement movement. A cone-shaped leaf spring 41 is disposed between an outer surface (left surface in FIGS. 11 and 12) of the input side disk 2B and a locking stepped portion formed on the outer peripheral surface of the intermediate portion of the input shaft 15a. The cone-shaped leaf spring 41 has elasticity smaller than that of the cone-shaped leaf spring 38 and serves to apply pre-pressure to contact areas between the inner surfaces 2a, 4a of the disks 2A, 2B, 4 and the peripheral surfaces 8a of the power rollers 8.

Further, the output gear 21a is rotatably supported by a partition wall 42 within the housing via a pair of ball bearings 43 of angular type while preventing axial displacement of the output gear. Incidentally, the reason why the toroidal type continuously variable transmission of double cavity type shown in FIGS. 11 and 12 supports one or both of the input side disks 2A, 2B opposed to the loading cam 10 on the input shaft 15a for axial displacement movement via the ball splines 39 is that the both disks 2A, 2B can be displaced in the axial direction with respect to the input shaft 15a in response to elastic deformation of structural members caused by the operation of the pressing device 9 while synchronizing the rotations of both disks 2A, 2B.

When the above-mentioned toroidal type continuously variable transmission of double cavity type is operated, the rotation of the drive shaft 35 is transmitted to the (left in FIG. 11) input side disk 2B through the pressing device 9 and then the rotation is transmitted to the other input side disk 2A through the input shaft 15a, with the result that, both input side disks 2A, 2B are rotated synchronously. The rotation of the input side disks 2A, 2B is transmitted to the pair of output side disks 4 through the plurality (two pairs in the illustrated example) of power rollers 8. As a result, the sleeve 45 having both ends spline-connected to the is output side disks 4 is rotated, so that the output gear 21a secured to the outer peripheral surface of the intermediate portion of the sleeve 45 is also rotated. In this way, in the toroidal type continuously variable transmission of double cavity type, since the transmission of rotation from the drive shaft 35 to the output gear 21a is effected by two parallel systems, great torque can be transmitted. Further, by changing the inclination angles of the power rollers 8 disposed between the disks 2A, 2B, 4 in a synchronous manner, the speed change ratio between the input side disks 2A, 2B and the output side disks 4 can be changed.

In case of the conventional arrangement shown in FIGS. 11 and 12, since the pair of output side disks 4 are spline-connected to both ends of the sleeve 45 to which the output gear 21a is secured, thickness of both ends of the sleeve 45 becomes inevitably smaller. Thus, torsional rigidity of the ends is reduced, with the result that it is difficult to transmit great torque between the output side disks 4 and the sleeve 45. Increase in thickness of the sleeve 45 is not preferable because it will be difficult to make the toroidal type continuously variable transmission compact and lightweight.

SUMMARY OF THE INVENTION

The present invention is made in consideration of the above-mentioned circumstances.

As is in conventional toroidal type continuously variable transmissions of double cavity type, for example, as shown in FIGS. 11 and 12, a toroidal type continuously variable transmission according to the present invention comprises first and second outer disks supported in coaxial relationship with each other and capable of being rotated synchronously in such an arrangement that inner surfaces of the disks are opposed to each other, a first inner disk supported in coaxial relationship with the first and second outer disks and capable of being rotated independently from the first and second outer disks and having an inner surface opposed to the inner surface of the first outer disk, a second inner disk supported in coaxial relationship with the first inner disk and capable of being rotated synchronously with the first inner disk and having an inner surface opposed to the inner surface of the second outer disk, a plurality of first pivot shafts disposed between the first outer disk and the first inner disk at positions where the pivot shafts do not intersect with a central axis of these discs but extend along directions perpendicular to the central axis, a plurality of first trunnions rockable around the first pivot shafts, first displacement shafts protruded from inner surfaces of the first trunnions, a plurality of first power rollers rotatable supported around the first displacement shafts and interposed between the inner surface of the first outer disk and the inner surface of the first inner disk, a plurality of second pivot shafts disposed between the second outer disk and the second inner disk at positions where the pivot shafts do not intersect with a central axis of these discs but extend along directions perpendicular to the central axis, a plurality of second trunnions rockable around the second pivot shafts, second displacement shafts protruded from inner surfaces of the second trunnions, and a plurality of second power rollers rotatably supported around the second displacement shafts and interposed between the inner surface of the second outer disk and the inner surface of the second inner disk; and the first and second inner disks are supported on both end portions of a cylindrical sleeve for rotation in synchronous manner with the sleeve.

Particularly in the toroidal type continuously variable transmission according to the present invention, concave portions or convex portions are formed on the opposed outer surfaces of the first and second inner disks, and convex portions or concave portions are formed on edge portions of the axial ends of the sleeve. And, by engaging the concave portions or convex portions formed on the opposed outer surfaces of the first and second inner disks with the convex portions or concave portions formed on the edge portions of the axial ends of the sleeve, synchronous rotations of the first and second inner disks and transmission of a rotational force between the first and second inner disks and the sleeve can be achieved.

The function of the toroidal type continuously variable transmission of the present invention having the above-mentioned arrangements for transmitting the rotational force from the first and second outer disks to the first and second inner disks through the two systems and the function for changing the speed change ratio between the first and second outer disks and the first and second inner disks are the same as those in the conventional toroidal type continuously variable transmissions of double cavity type as shown in FIGS. 11 and 12.

In the case of the toroidal type continuously variable transmission of the present invention, since the arrangement for rotating the first and second inner disks and the sleeve synchronously is obtained by the engagement between the axial concave and convex portions, due to the engagement, a thickness of portions of the sleeve in the engagement areas between the sleeve and the first and second inner disks is not reduced. Thus, without particularly increasing the thickness of the sleeve, great torque can be transmitted while maintaining adequate endurance of the sleeve.

The other objects and features of the present invention will be apparent from the following explanation regarding embodiments thereof referring to the accompanying drawings.

DETAILED DESCRIPTION OF THE PREFERRED EMBODIMENTS

Figure 1:
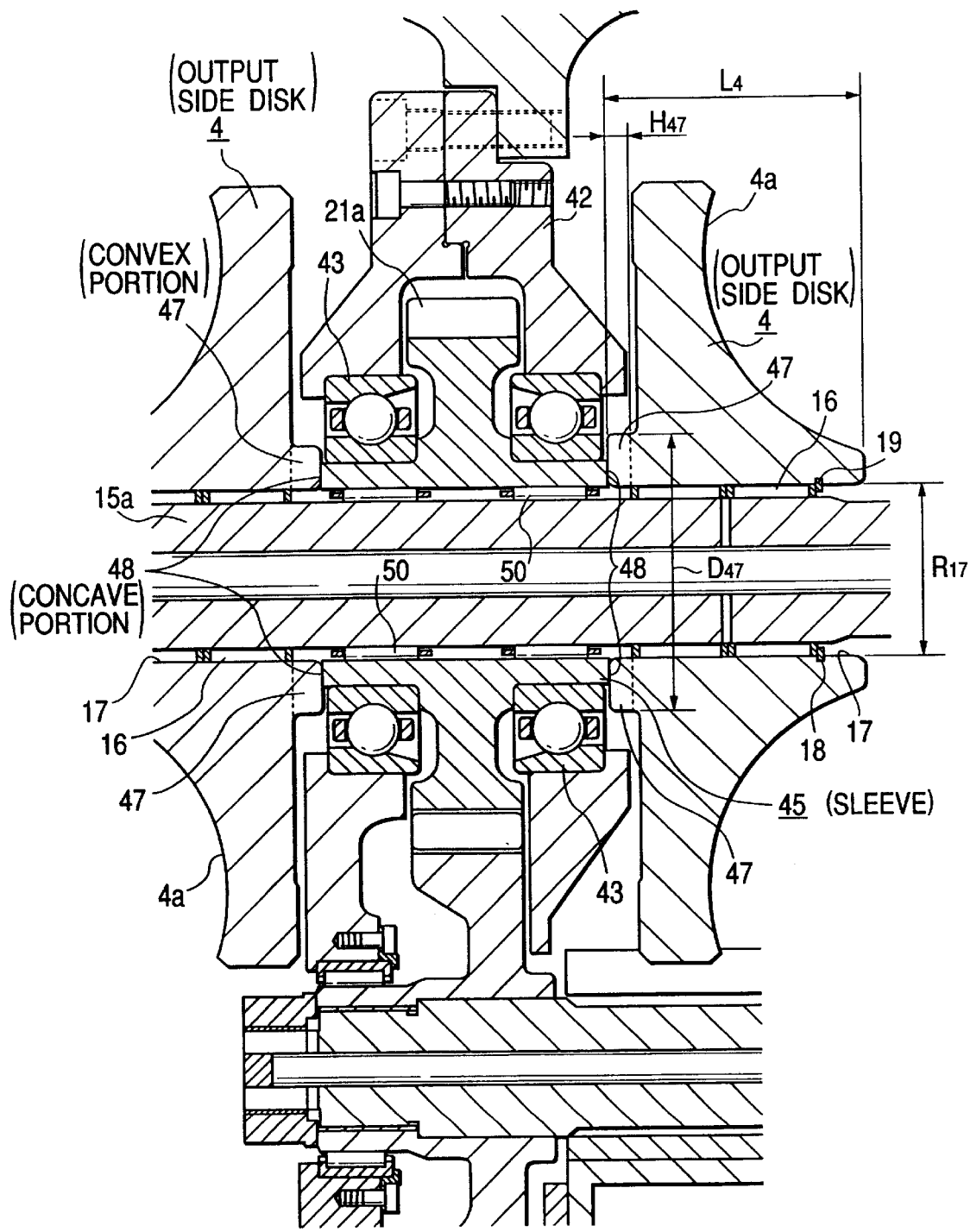
FIG. 1 is a partial sectional view showing a first embodiment of the present invention.
Figure 2:
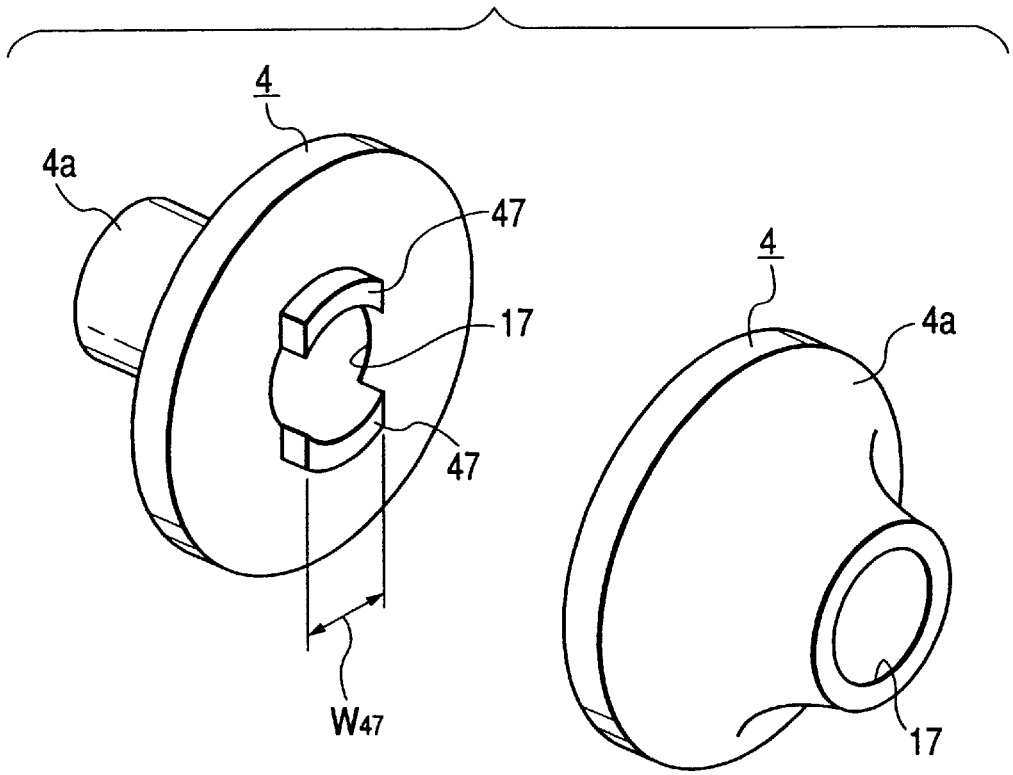
FIG. 2 is a perspective view of a pair of output side disks to be incorporated into the first embodiment.
Figure 3:
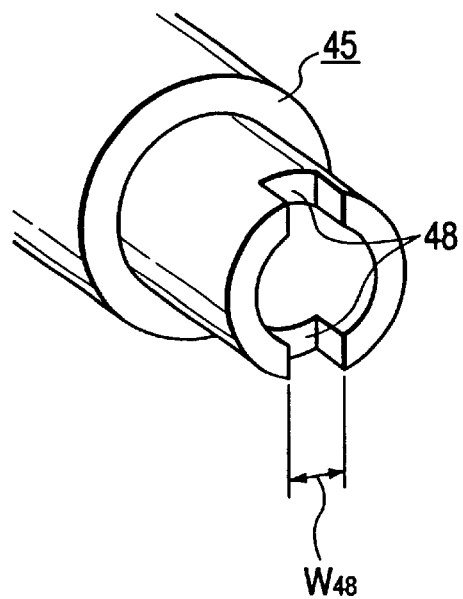
FIG. 3 is an end perspective view of a sleeve.
Figure 11:
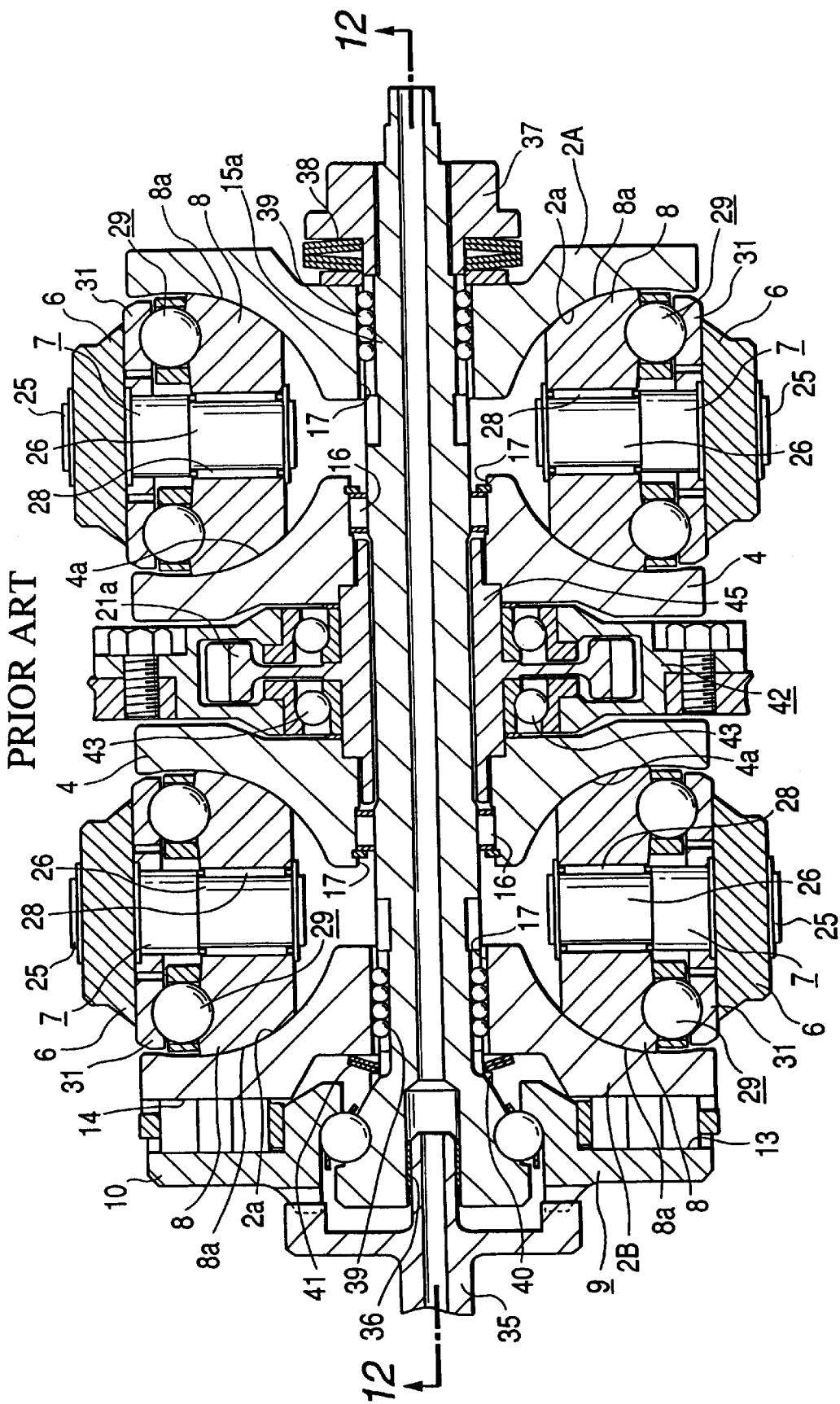
FIG. 11 a partial sectional view showing a second example of a detailed construction of a toroidal type continuously variable transmission.
Figure 12:
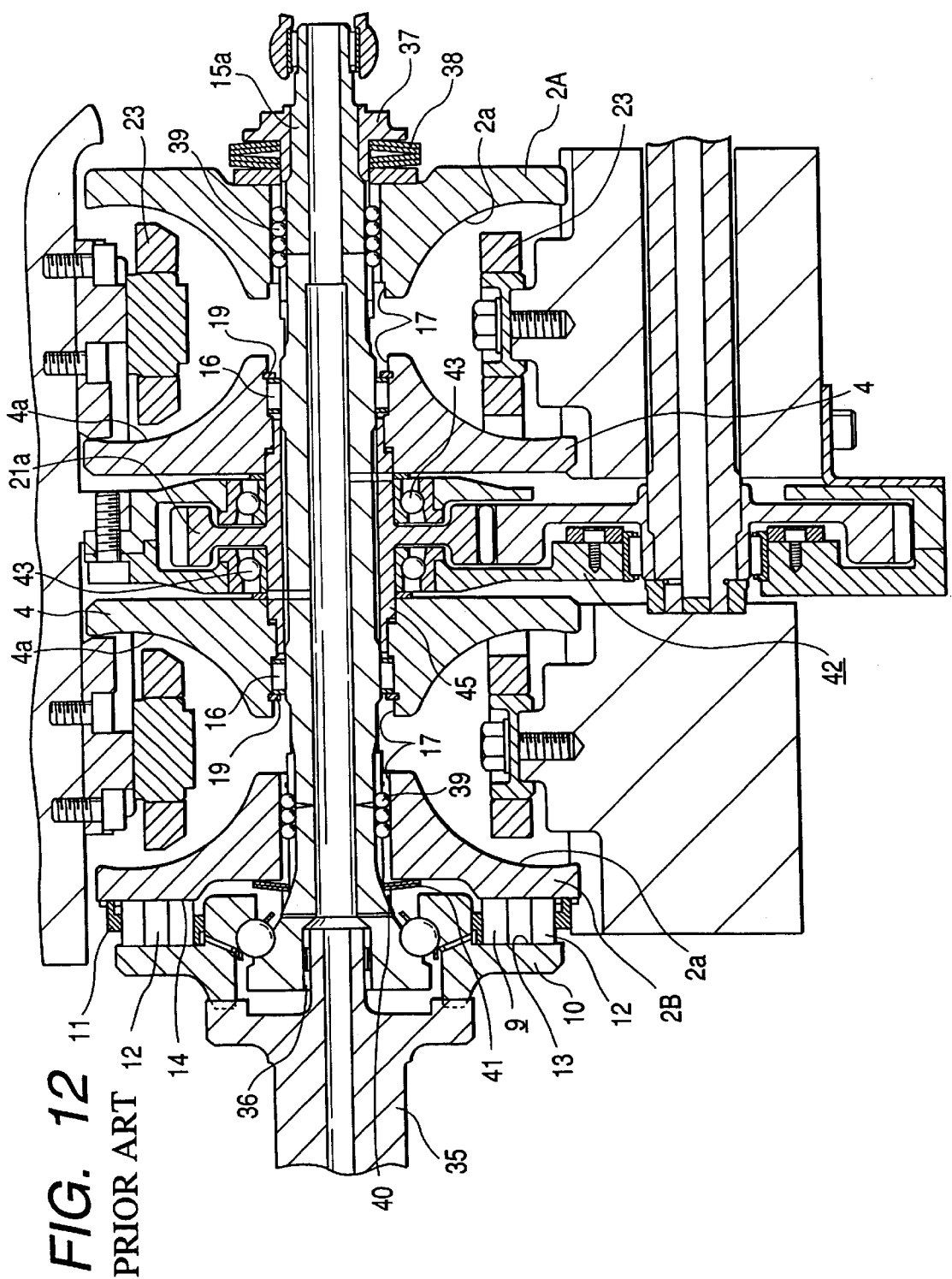
FIG. 12 is a sectional view taken along the line 12—12 in FIG. 11.

FIGS. 1 to 3 show a first embodiment of the present invention. The present invention is characterized by engagement portions between a pair of outside disks (first and second inner disks) 4 and axial end portions of a sleeve 45 having an outer peripheral surface of its intermediate portion to which an output gear 21a is secured. Since the other arrangements and functions are the same as those in the aforementioned technique shown in FIGS. 11 and 12, explanation and illustration of the same or similar parts will be omitted or simplified, and the characteristic portions of the present invention will mainly be explained hereinbelow.

Sector-shaped convex (protruding portions 47 as shown in FIG. 2 are formed on opposed surfaces of the pair of output side disks 4 at two diametrically opposed positions regarding through holes 17 formed in the centers of the output side disks 4. The convex portions 47 are located on a circle around the through hole 17. On the other hand, notched concave recessed) portions 48 as shown in FIG. 3 are formed in edges of both axial ends of the sleeve 45 at two diametrically opposed positions. Width-wise dimensions $W_{48}$ of the concave portions 48 are equal to or slightly greater than width-wise dimensions $W_{47}$ of the convex portions 47 ($W_{48} \geq W_{47}$), so that the convex portions 47 can be fitted into the concave portions 48 without any play. Incidentally, since the concave portions 48 and the convex portions 47 are diametrically opposed; respectively, in a condition that the concave portions 48 and the convex portions 47 are fitted to each other, the output side disks 4 and the sleeve 45 can be arranged in coaxial with each other.

As shown in FIG. 1, the above-mentioned output side disks 4 and sleeve 45 are assembled so that the convex portions 47 are fitted into the concave portions 48 without any play, thereby forming a toroidal type continuously variable transmission of double cavity type. In the assembled condition and in a running condition, the output side disks 4 are urged toward both end edges of the sleeve 45 by a plurality of power rollers 8 (FIG. 11), respectively. Accordingly, the engagement between the concave portions 48 and the convex portions 47 is not accidentally released, so that synchronous rotations of the pair of output side disks 4 and transmission of a rotational force between the pair of output side disks 4 and the sleeve 45 can be achieved.

In case of the toroidal type continuously variable transmission of the present invention having the above-mentioned construction, since the structure for rotating the pair of output side disks 4 and the sleeve 45 in a synchronous manner is obtained by the engagement between the convex portions 47 protruded axially and the concave portions 48 recessed axially, due to the engagement, a thickness of portions of the sleeve 45 in the engagement areas between the sleeve and the pair of output side disks 4 is not reduced at both axial ends. Thus, without particularly increasing the thickness of the sleeve 45, great torque can be transmitted while maintaining adequate endurance of the sleeve 45.

Incidentally, in case of the toroidal type continuously variable transmission of the present embodiment the output side disks 4 can be displaced diametrically with respect to the sleeve 45. So ball bearings 43 for supporting the sleeve 45 cannot regulate diametrical positions of the output side disks 4. However, since the output side disks 4 are positioned in the diametrical direction by means of needle bearings 16 between the output side disks and an outer peripheral surface of an input shaft 15a, during the operation of the toroidal type continuously variable transmission, the output side disks 4 are not deviated in the diametrical direction.

Further, it is preferable that an outer diameter $D_{47}$ of each convex portion 47 is greater than an inner diameter $R_{17}$ of each of the through holes 17 formed in the centers of the output side disks 4 by 1.2 to 2.5 times ($D_{47}$=(1.2 to 2.5) $R_{17}$). If the outer diameter $D_{47}$ of the convex portion 47 is smaller than such a value ($D_{47}$<1.2 $R_{17}$), it is difficult to ensure strength of the convex portions 47. On the other hand, if the outer diameter $D_{47}$ of the convex portion 47 exceeds such a value ($D_{47}$>2.5 $R_{17}$), in order to prevent interference between the convex portions 47 and outer races of the ball bearings 43, it is required that outer diameters of the ball bearings 43 be increased excessively, thereby making compactness and weight reduction of the toroidal type continuously variable transmission difficult. Further, it is preferable that an axial height $H_{47}$ of the convex portion 47 is greater than 1/20 and smaller than 1/4 of an axial length $L_4$ of the output side disk 4 {$H_{47}$=(1/20 to 1/4) $L_4$}. If the height $H_{47}$ of the convex portion 47 is smaller than such a value {$H_{47}$< (1/20) $L_4$}, it is difficult to ensure strength of the engagement portions between the convex portions 47 and the concave portions 48. On the other hand, if the height $H_{47}$ of the convex portion 47 is greater than such a value {$H_{47}$>(1/4) $L_4$}, axial lengths of the engagement portions between the convex portions 47 and the concave portions 48 become great, thereby not only making compactness and weight reduction of the toroidal type continuously variable transmission difficult, but also making maintenance of torsional rigidity of the engagement portions between the convex portions 47 and the concave portions 48 difficult. Incidentally, dimensional relationship between such parts are also the same in a second embodiment of the present invention which will be described hereinbelow.

Figure 4:
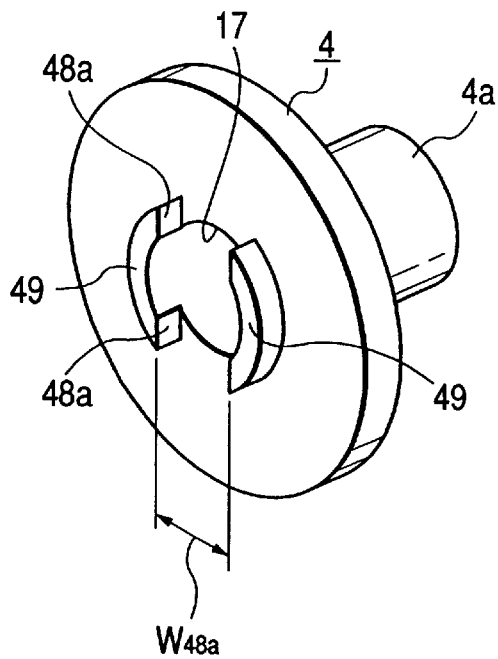
FIG. 4 is a perspective view of an output side disk to be incorporated into a second embodiment of the present invention.
Figure 5:
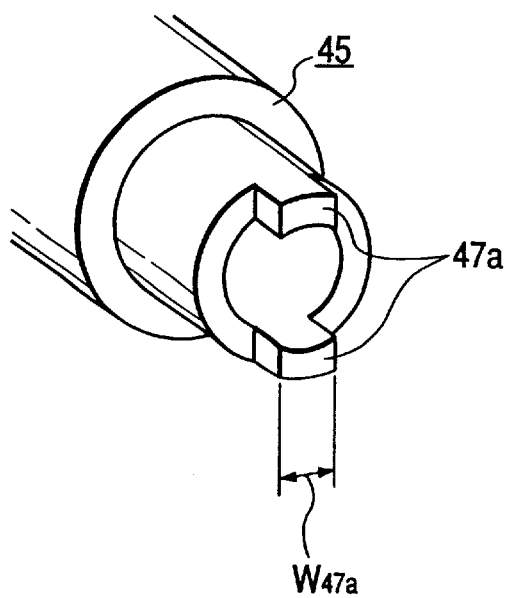
FIG. 5 is an end perspective view of a sleeve.

FIGS. 4 and 5 show a second embodiment of the present invention. In this second embodiment, a partially cut annular projection 49 as shown in FIG. 4 is formed on the outer surface of each output side disk 4, and two diametrically opposed discontinuous regions of the projection 49 constitute concave portions 48a. On the other hand, convex portions 47a are formed on edges of both axial ends of the sleeve 45 at two diametrically opposed positions. Also in this embodiment, a width-wise dimension $W_{48a}$ of each concave portion 48a is selected to be equal to or slightly greater than a width-wise dimension $W_{47a}$ of each convex portion 47a ($W_{48a} \geq W_{47a}$) so that the convex portions 47a can be fitted into the concave portions 48a without any play. The second embodiment is the same an the first embodiment, except that the concave portions and the convex portions are formed reversely.

Incidentally, in the above-mentioned embodiment, the convex portions 47a and the concave portions 48a are diametrically opposed. In order to stabilize transmission of the rotational force between the output side disks 4 and the sleeve 45, it is required that a plurality of convex portions 47a and a plurality of concave portions 48a be provided equidistantly along a circumferential direction. As is in the illustrated embodiment, when the convex portions 47a and the concave portions 48a are provided at two diametricaly opposed positions, a structure for transmitting the rotation stably can be achieved with low cost by a relatively simple working. However, if cost may be increased, three or more (for example, three or four) convex portions 47a and concave portions 48a may be provided equidistantly along a circumferential direction.

Figure 6:
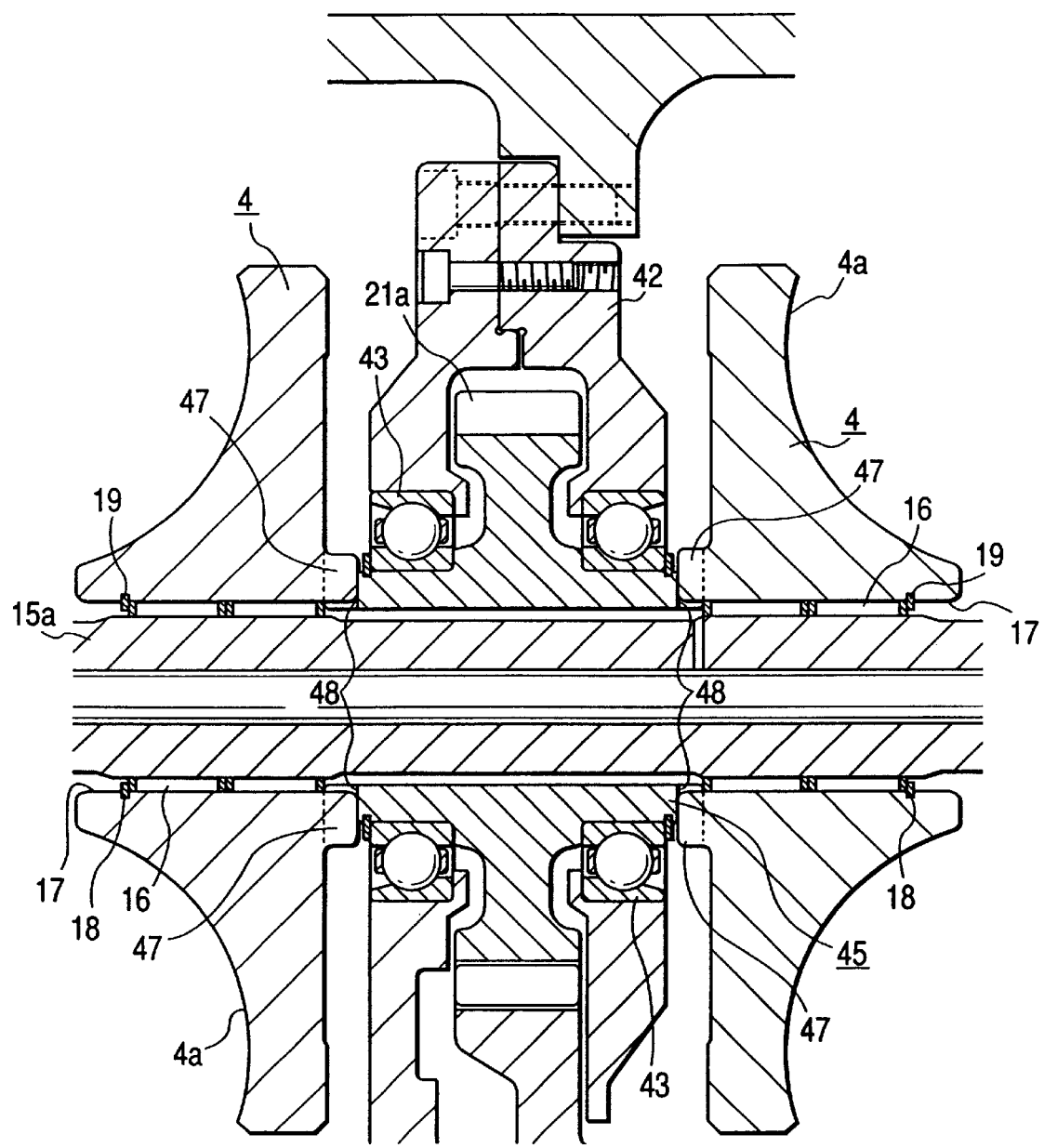
FIG. 6 is a partial sectional view showing a third embodiment of the present invention.
Figure 7:
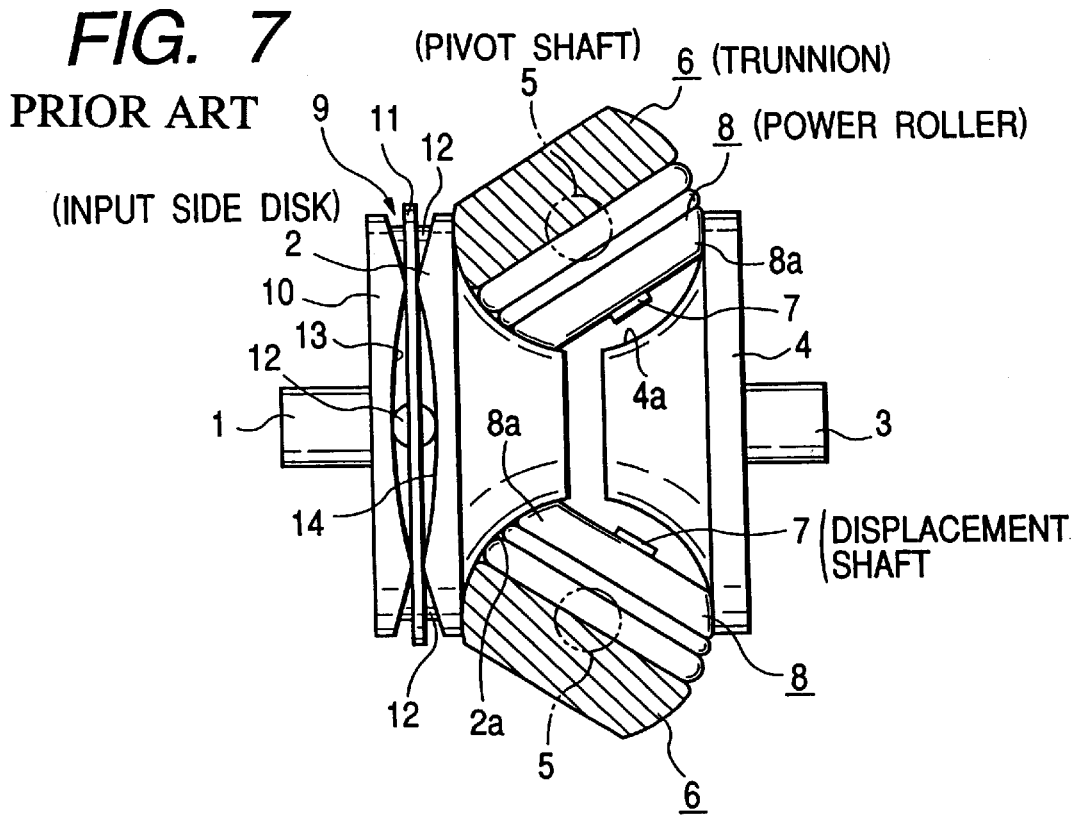
FIG. 7 is a side view showing a fundamental construction of a conventional toroidal type continuously variable transmission in a maximum deceleration condition.
Figure 8:
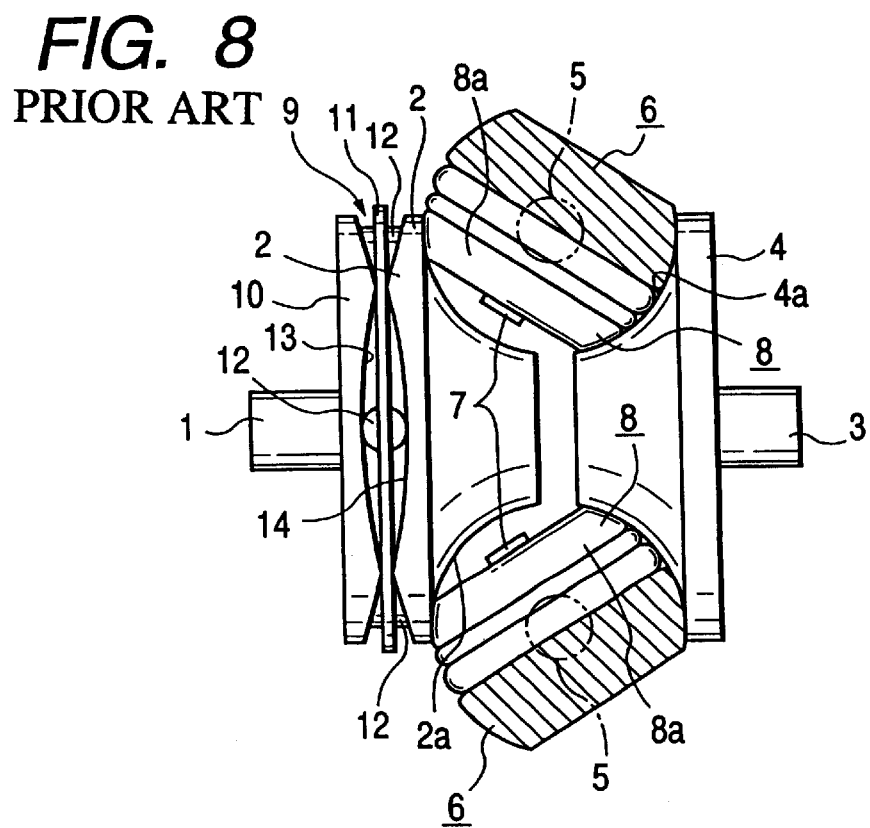
FIG. 8 is a side view showing the toroidal type continuously variable transmission in a maximum acceleration condition.
Figure 9:
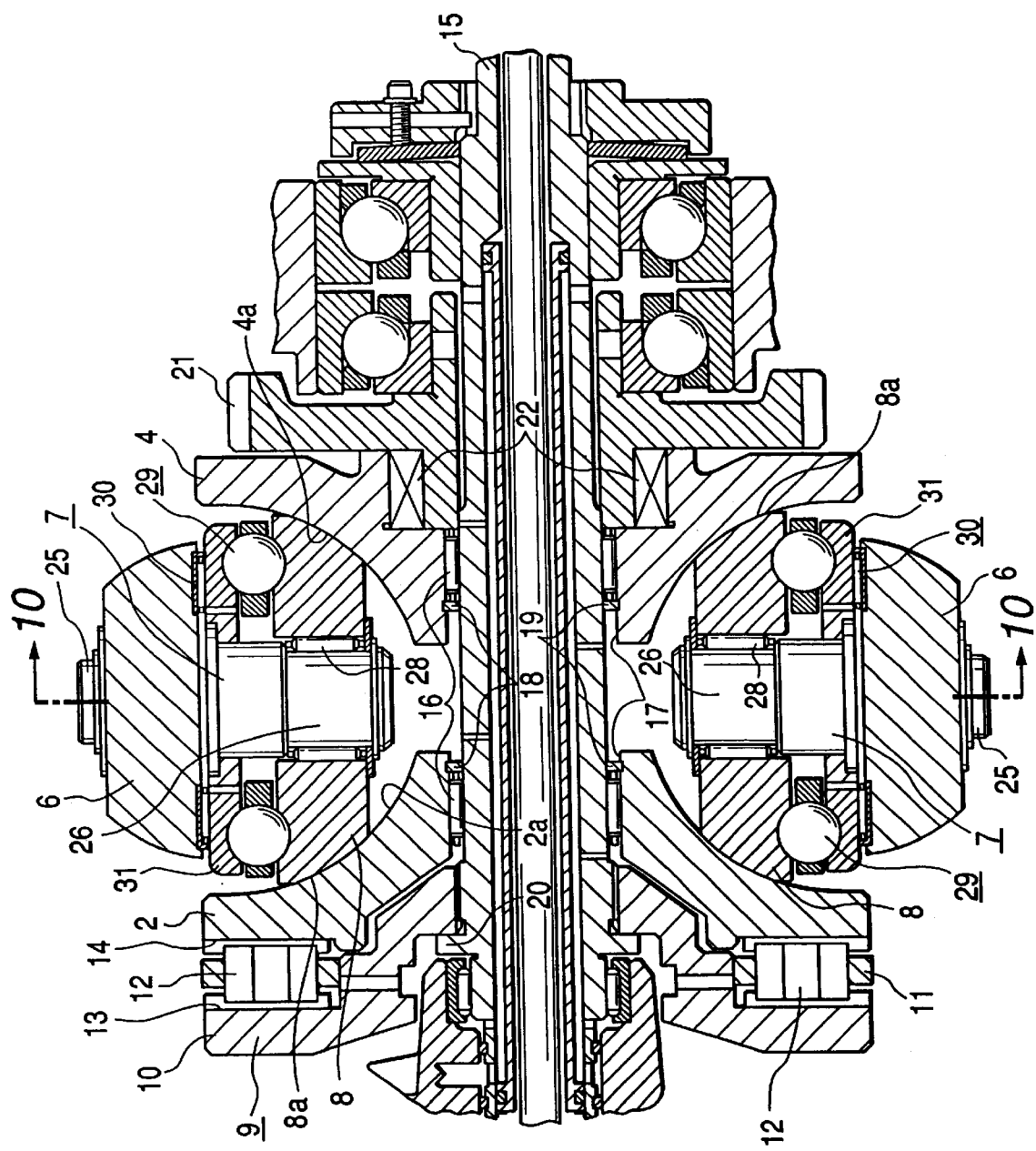
FIG. 9 is a sectional view showing a first example of a detailed construction of a toroidal type continuously variable transmission.
Figure 10:
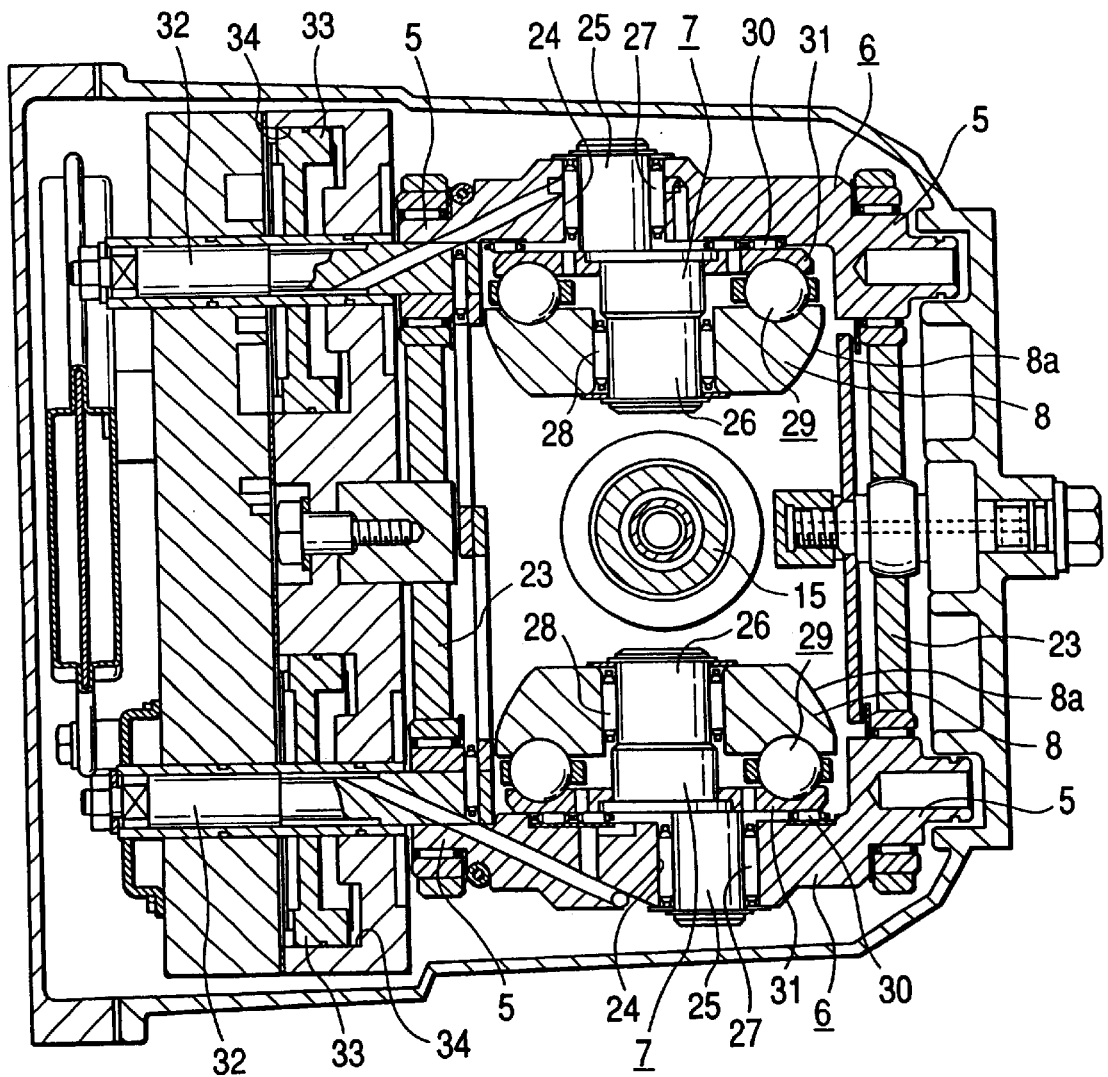
FIG. 10 is a sectional view taken along the line 10—10 in FIG. 9.

FIG. 6 shows a third embodiment of the present invention. In the first embodiment shown in FIG. 1, in order to support the sleeve 45 by the partition wall 42, the pair of ball bearings 43 of angular type are arranged in the front assembling (DF) manner, and the radial needle bearings 50 are disposed between the inner peripheral surface of the sleeve 45 and the outer peripheral surface of the input shaft 15a to prevent the falling of the sleeve 45. To the contrary, in the third embodiment, in order to support the sleeve 45 by the partition wall 42, a pair of ball bearings 43 of angular type are arranged in a back assembling (DB) manner, and the radial needle bearings 50 are omitted. The other constructions and functions are the same as those in the first embodiment.

Since the present invention has the above-mentioned arrangement so that, even when the thickness of the sleeve is not particularly increased, great torque can be transmitted while ensuring adequate endurance of the sleeve, a compact and light-weight toroidal type continuously variable transmission can be provided.

Many widely different embodiments of the present invention may be constructed without departing from the spirit and scope of the present invention. It should be understood that the present invention is not limited to the specific embodiments described in the specification, except as defined in the appended claims.

What is claimed is:

1. A toroidal continuously variable transmission, comprising:

first and second outer disks supported in coaxial relationship with each other and capable of being rotated synchronously, inner surfaces of said disks being faced toward each other;

a first inner disk supported in coaxial relationship with said first and second outer disks and capable of being rotated relative to said first and second outer disks, said first inner disk having an inner surface opposed to the inner surface of said first outer disk;

a second inner disk supported in coaxial relationship with said first inner disk and capable of being rotated synchronously with said first inner disk, said second inner disk having an inner surface opposed to the inner surface of said second outer disk and an outer surface opposed to an outer surface of said first inner disk;

a plurality of first pivot shafts disposed between said first outer disk and said first inner disk at positions where said first pivot shafts do not intersect with a central axis of the inner disks and the outer disks but extend along directions perpendicular to the central axis;

a plurality of first trunnions rockable via said first pivot shafts;

first displacement shafts protruded from inner surfaces of said first trunnions;

a plurality of first power rollers rotatably supported around said first displacement shafts and interposed between the inner surface of said first outer disk and the inner surface of said first inner disk;

a plurality of second pivot shafts disposed between said second outer disk and said second inner disk at positions where said second pivot shafts do not intersect with said central axis but extend along directions perpendicular to said central axis;

a plurality of second trunnions rockable via said second pivot shafts;

second displacement shafts protruded from inner surfaces of said second trunnions; and a plurality of second power rollers rotatably supported around said second displacement shafts and interposed between the inner surface of said second outer disk and the inner surface of said second inner disk;

wherein said first and second inner disks are engaged, respectively, with opposite axial end portions of a cylindrical sleeve for rotation synchronously with said sleeve;

said outer surface of each inner disk has only a single pair of concave or convex portions engaged with only a single pair of convex or concave portions on the corresponding axial end of said sleeve; and said engaged portions of each inner disk with said sleeve include surfaces that extend substantially parallel to said central axis and that are positioned such that said inner disks are displaceable relative to said sleeve substantially perpendicularly to said central axis.

2. A toroidal continuously variable transmission according to claim 1, wherein an output gear is secured at an intermediate portion of an outer peripheral surface of said sleeve.

3. A toroidal continuously variable transmission according to claim 2, wherein a pair of ball bearings are arranged between said sleeve and a partition wall provided inside of a casing, in order to support said output gear by said partition wall.

4. A toroidal continuously variable transmission according to claim 1, wherein a width of each concave portion is equal to or slightly larger than a width of the corresponding convex portion.

5. A toroidal continuously variable transmission according to claim 1, wherein an outer diameter of each convex portion is greater than a diameter of an axial through hole formed in a central portion of the corresponding one of said inner disk and said sleeve by 1.2 to 2.5 times.

6. A toroidal continuously variable transmission according to claim 1, wherein said convex portions are arranged at outer axial end surfaces of said inner disks, and a height of each said convex portion in a direction of said central axis is greater than $\frac{1}{20}$ and smaller than $\frac{1}{4}$ of an axial length of the corresponding inner disk.

7. A toroidal continuously variable transmission according to claim 1, wherein said concave portions are defined by discontinuous annular projections provided at outer axial end surfaces of said inner disks, with discontinuous portions of each projection being arranged at equal intervals circumferentially of the corresponding inner disk.

8. A toroidal continuously variable transmission, comprising:

first and second outer disks supported in coaxial relationship with each other and capable of being rotated synchronously, inner surfaces of said disks being faced toward each other;

a first inner disk supported in coaxial relationship with said first and second outer disks and capable of being rotated relative to said first and second outer disks, said first inner disk having an inner surface opposed to the inner surface of said first outer disk;

a second inner disk supported in coaxial relationship with said first inner disk and capable of being rotated synchronously with said first inner disk, said second inner disk having an inner surface opposed to the inner surface of said second outer disk and an outer surface opposed to an outer surface of said first inner disk;

a plurality of first power rollers rockably disposed between the inner surface of said first outer disk and the inner surface of said first inner disk to transmit rotation therebetween;

a plurality of second power rollers rockably disposed between the inner surface of said second outer disk and the inner surface of said second inner disk to transmit rotation therebetween;

wherein said first and second inner disks are engaged, respectively, with opposite axial end portions of a cylindrical sleeve for rotation synchronously with said sleeve;

said outer surface of each inner disk has only a single pair of concave or convex portions engaged with only a single pair of convex or concave portions on the corresponding axial end of said sleeve; and said engaged portions of each inner disk with said sleeve include surfaces that extend substantially parallel to said central axis and that are positioned such that said inner disks are displaceable relative to said sleeve substantially perpendicularly to said central axis.

9. A toroidal continuously variable transmission according to claim 8, wherein an output gear is secured at an intermediate portion of an outer peripheral surface of said sleeve.

10. A toroidal continuously variable transmission according to claim 9, wherein a pair of ball bearings are arranged between said sleeve and a partition wall provided inside of a casing, in order to support said output gear by said partition wall.

11. A toroidal continuously variable transmission according to claim 8, wherein a width of each concave portion is equal to or slightly larger than a width of the corresponding convex portion.

12. A toroidal continuously variable transmission according to claim 8, wherein an outer diameter of each convex portion is greater than a diameter of an axial through hole formed in a central portion of the corresponding one of said inner disk and said sleeve by 1.2 to 2.5 times.

13. A toroidal continuously variable transmission according to claim 8, wherein said convex portions are arranged at outer axial end surfaces of said inner disks, and a height of each said convex portion in a direction of said central axis is greater than $1/20$ and smaller than $1/4$ of an axial length of the corresponding inner disk.

14. A toroidal continuously variable transmission according to claim 8, wherein said concave portions are defined by discontinuous annular projections provided at outer axial end surfaces of said inner disks, with discontinuous portions of each projection being arranged at equal intervals circumferentially of the corresponding inner disk.

15. A toroidal continuously variable transmission according to claim 1, wherein said surfaces of said engaged portions are planar.

16. A toroidal continuously variable transmission according to claim 8, wherein said surfaces of said engaged portions are planar.

* * * * *